US008967675B2

(12) United States Patent
Do et al.

(10) Patent No.: US 8,967,675 B2
(45) Date of Patent: Mar. 3, 2015

(54) ELLIPTICAL UNDERCUT SHOULDER FOR SPECIALTY PIPE CONNECTIONS

(75) Inventors: Vinh K. Do, Oklahoma, OK (US); Joseph William Pallini, Jr., Tomball, TX (US); Kevin Edward O'Dell, Katy, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 13/593,932

(22) Filed: Aug. 24, 2012

(65) Prior Publication Data
US 2014/0054890 A1 Feb. 27, 2014

(51) Int. Cl.
F16L 35/00 (2006.01)

(52) U.S. Cl.
USPC .......................................................... 285/333

(58) Field of Classification Search
USPC .................................................. 285/333, 334
See application file for complete search history.

(56) References Cited

U.S. PATENT DOCUMENTS

| 1,223,591 | A |   | 4/1917  | Layne |
|-----------|---|---|---------|-------|
| 2,205,697 | A | * | 6/1940  | Scharpenberg ............... 285/333 |
| 3,047,313 | A | * | 7/1962  | Bruce ........................... 285/333 |
| 3,345,084 | A |   | 10/1967 | Hanes et al. |
| 4,572,549 | A | * | 2/1986  | Sidwell ......................... 285/333 |
| 4,601,491 | A | * | 7/1986  | Bell et al. ...................... 285/334 |
| 4,629,221 | A | * | 12/1986 | Lumsden et al. ............. 285/334 |
| 4,892,337 | A | * | 1/1990  | Gunderson et al. ........... 285/333 |
| 5,388,866 | A |   | 2/1995  | Schlosser |
| 5,450,904 | A |   | 9/1995  | Galle |
| 5,997,045 | A |   | 12/1999 | Boe et al. |
| 6,047,997 | A | * | 4/2000  | Olivier ........................... 285/333 |
| 6,056,324 | A | * | 5/2000  | Reimert et al. ............... 285/334 |
| 6,070,913 | A |   | 6/2000  | Hopper et al. |
| 6,485,063 | B1 | * | 11/2002 | Olivier ........................... 285/333 |
| 6,578,881 | B2 |   | 6/2003  | Lynn et al. |
| 6,752,436 | B1 |   | 6/2004  | Verdillon |
| 6,817,633 | B2 |   | 11/2004 | Brill et al. |
| 7,237,810 | B2 |   | 7/2007  | Hollingsworth et al. |
| 7,549,682 | B2 |   | 6/2009  | Pallini, Jr. et al. |
| 8,056,940 | B2 | * | 11/2011 | Morgan et al. ................ 285/333 |

FOREIGN PATENT DOCUMENTS

WO 9429565 A1 12/1994

OTHER PUBLICATIONS

PCT Search Report and Written Opinion issued Jun. 11, 2014 in connection with corresponding PCT Patent Application No. PCT/US2013/055745.

* cited by examiner

*Primary Examiner* — David E Bochna
(74) *Attorney, Agent, or Firm* — Bracewell & Giuliani LLP

(57) ABSTRACT

A tubular connector connects two tubulars of a string of tubular members. The tubular connector has a pin end tubular member having an axis and a pin end. A pin end flange is positioned on an outer diameter of the pin end and has an undercut adjacent the union of the pin end flange with the pin end. The tubular connector also has a box end tubular member having a box end. A box end shoulder is adjacent the union of the box end with the box end tubular member. The box end shoulder has an undercut thereon. The pin end is secured to the box end so that the pin end tubular member and the box end tubular member are joined, stresses applied to the pin end tubular member and the box end tubular member are distributed through the undercuts.

19 Claims, 2 Drawing Sheets

ELLIPTICAL UNDERCUT SHOULDER FOR SPECIALTY PIPE CONNECTIONS

BACKGROUND OF THE INVENTION

1. Field of the Invention

This invention relates in general to drilling and production of oil and gas wells and, in particular, to a tubular connector having an elliptically undercut shoulder.

2. Brief Description of Related Art

Offshore hydrocarbon wells often contain one or more casing strings of large diameter pipe, such as 16 inches or greater in diameter. Production risers extending from subsea well equipment to the surface are also made-up of fairly large diameter pipes. The joints of pipe, whether in a casing string or production riser string, are connected together by threaded connections. A typical threaded connection has internal threads on a conical portion of a box that engage external threads on a pin. Normally, the pin has an external shoulder at the base of the threads that is engaged by the rim of the box when made up.

Many prior art riser or tubular member joint connectors use pin and box type connectors. These pin and box type connectors have a first tubular member with a larger diameter portion on an end, the box, and a second tubular member with a smaller diameter portion on an end, the pin. The pin inserts into the box end to join the two tubular members by any suitable means such as threading of the pin into the box, cammed engagement of grooves, or the like. Generally, the tubular members transition to the larger diameter connector portions across a fairly short distance, often having angles that are substantially close to right angles between the connector and the tubing. These right angle transitions provide a substantially planar surface that is perpendicular to an axis of the tubular for engagement with a tubing elevator for manipulation of the tubular member. Unfortunately, these transition areas are often subject to high stress that may cause early failure of the connector. Attempts have been made to reduce this stress by increasing the length of the transition; however, a longer transition generally requires an increase in the clamping diameter of elevator as the thickness of the tubular at the engagement point of the elevator will increase by increasing the transition. A longer transition requires use of specialty elevators to accommodate the thicker tubing diameter.

SUMMARY OF THE INVENTION

These and other problems are generally solved or circumvented, and technical advantages are generally achieved, by preferred embodiments of the present invention. In accordance with an embodiment of the present invention, a tubular connector is disclosed having a pin with a bore and external threads. An external flange on the pin has an abutment shoulder on one side and a pin transition shoulder on an opposite side and facing in an opposite direction from the abutment shoulder. The pin transition shoulder is in a plane perpendicular to the axis. The pin has a cylindrical portion with a smaller outer diameter than an outer diameter of the external flange adjoining the pin transition shoulder. A box has a bore with internal threads that engage the external threads of the pin. The box has a rim that abuts the abutment shoulder. The box has a cylindrical portion opposite the rim that is of smaller outer diameter than a portion of the box containing the internal threads, defining a box transition shoulder that is in a plane perpendicular to the axis. An annular undercut recess is located on at least one of the transition shoulders at a junction with the cylindrical portion joining the transition shoulder.

The undercut recess preferably has a partially elliptical profile in cross section. When viewed in cross section the undercut recess is a continuous U-shaped curve with an axial depth greater than a radial width.

When viewed in cross section, the undercut recess has an inner curved wall, an outer curved wall, and a curved base joining the inner curved wall with the outer curved wall. The inner curved wall is flush with the cylindrical portion adjoining the transition shoulder. The undercut recess has a radial width that is less than one-half a radial width of the transition shoulder on which it is located.

Each of the transition shoulders may have one of the undercut recesses, or only one of the transition shoulders. If located on the transition shoulder of the external flange, the undercut recess has an axial depth that is less than one-half an axial thickness of the external flange. In that instance, the external flange has a lesser axial thickness measured between the undercut recess and the abutment shoulder than measured at the outer diameter of the external flange.

An advantage of a preferred embodiment is that it provides a tubular connector that transitions between the tubular and the tubular connector over a longer distance. This transition has a reduced stress across the transition between the tubular and the connector. In addition, the disclosed embodiments provide a tubular connector that may be used with conventional tubing elevators.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

In the following discussion, numerous specific details are set forth to provide a thorough understanding of the present invention. However, it will be obvious to those skilled in the art that the present invention may be practiced without such specific details. Additionally, for the most part, details concerning rig operation, subsea assembly connections, riser use, and the like have been omitted inasmuch as such details are not considered necessary to obtain a complete understanding of the present invention, and are considered to be within the skills of persons skilled in the relevant art.

Figure 1:
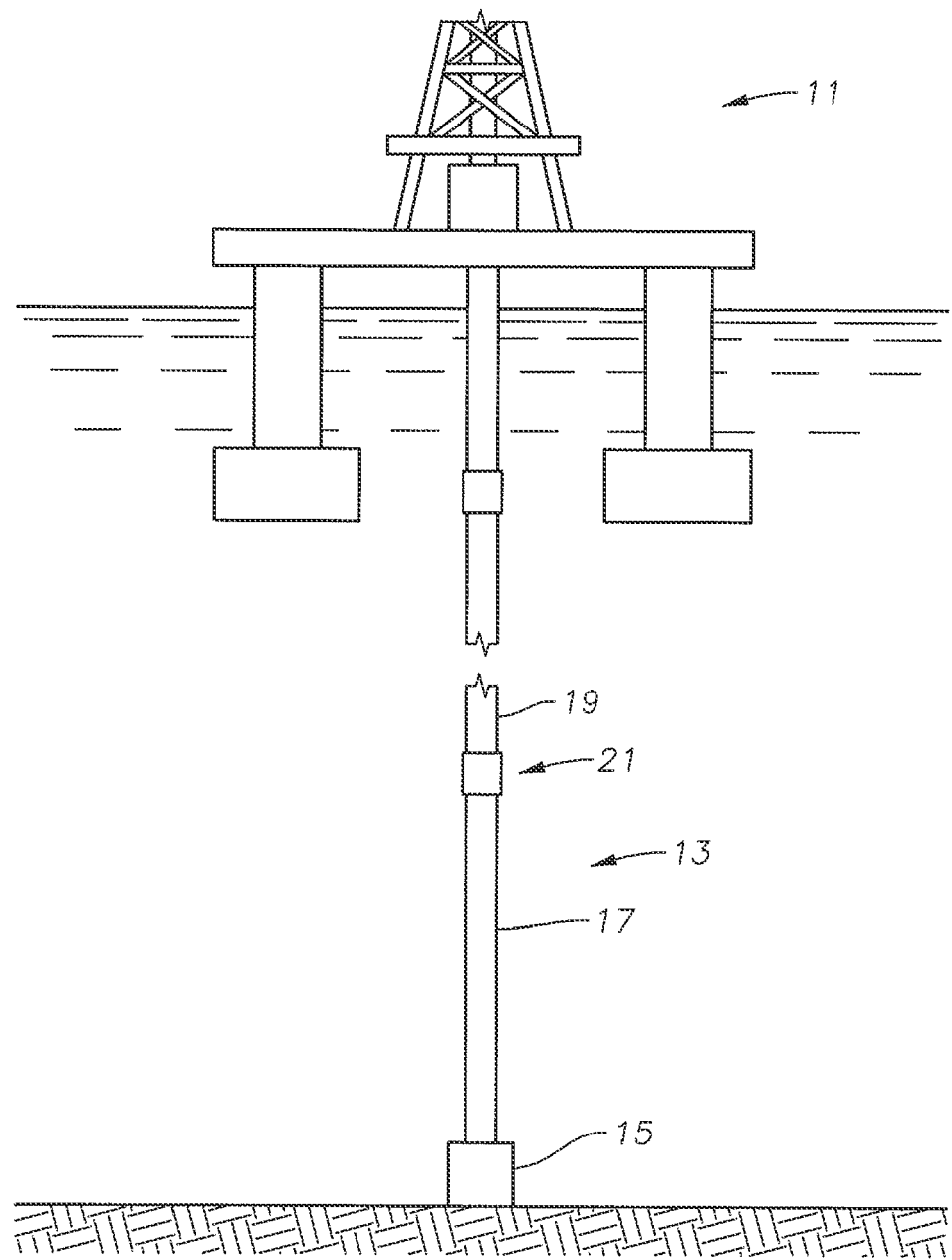
FIG. 1 is a schematic representation of a riser extending between a subsea wellhead assembly and a surface platform in accordance with an embodiment.

Described herein are example embodiments of connecting tubulars to form a string of tubulars. Shown in a side view in FIG. 1 is one example of an offshore platform 11 having a string of tubulars 13 depending subsea for connection with a subsea wellhead assembly 15 shown on the sea floor. String of tubulars 13 may be formed of a plurality of tubulars, for example a lower tubular 17 and an upper tubular 19, extending several thousand feet between platform 11 and subsea wellhead assembly 15. In the embodiment of FIG. 1, string of tubulars 13 is assembled by connecting tubulars 17, 19 at a joint 21 in the manner described in more detail below.

Figure 2:
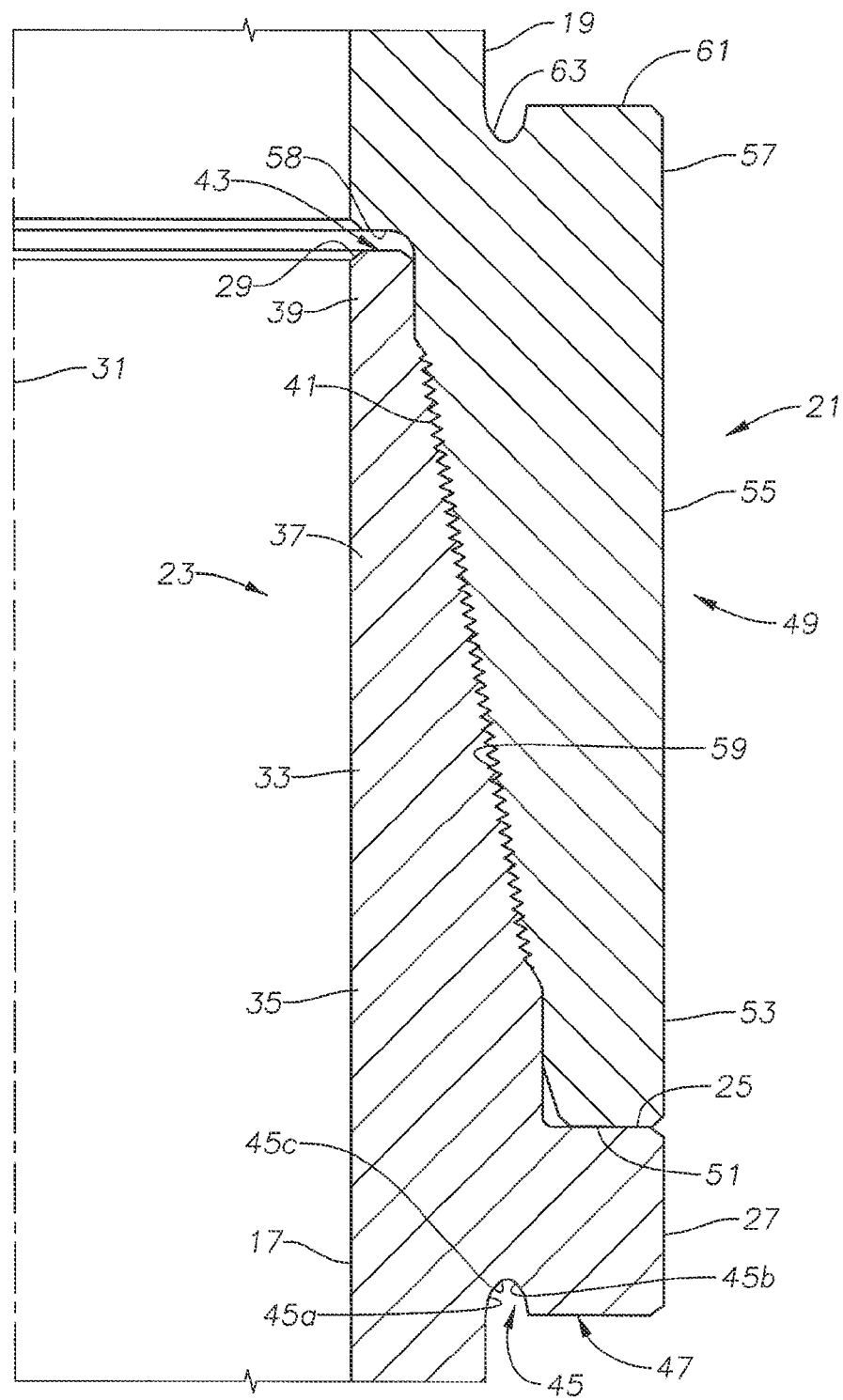
FIG. 2 is a side sectional view of a portion of a joint for connecting two tubulars of the riser of FIG. 1 in accordance with an embodiment.

Referring to FIG. 2, a sectional view of joint 21 in a made-up position is shown. Lower tubular 17 has a pin end 23 having an upward facing abutment shoulder 25 on an outer diameter portion of lower tubular 17. As shown in FIG. 2, pin end 23 includes an outer diameter flange 27 having an outer diameter larger than the diameter of a cylindrical portion of lower tubular 17. Flange 27 may be axially spaced from a nose end 29 of pin end 23 along an axis 31 of lower tubular 17. Abutment shoulder 25 extends from an outer diameter of pin end 23 radially outward to the outer diameter of flange 27. Pin end 23 includes an upwardly extending pin 33. Pin 33 includes a cylindrical proximal pin end portion 35 proximate to flange 27. Proximal pin end portion 35 may join flange 27 proximate to upward facing shoulder 25. Pin 33 includes a conical medial pin end portion 37 extending toward nose end 29 from proximal pin end portion 35. In the illustrated embodiment, medial pin end portion 37 tapers from proximal pin end portion 35 to a nose or distal pin end portion 39 of pin 33 at end 29 of pin 33. In the illustrated embodiment, medial pin end portion 37 is wider at proximal pin end portion 35 than at distal pin end portion 39. Threads or grooves 41 are formed on an outer diameter surface of medial pin end portion 37. Distal pin end portion 39 may be generally cylindrical as shown in FIG. 2 and have an axial length such that end 29 may be spaced apart from medial pin end portion 37. Distal pin end portion 39 also includes an upwardly facing nose shoulder 43 at nose end 29. Nose shoulder 43 may be flat or it may be conical. A person skilled in the art will recognize that in other embodiments upwardly facing shoulder 43 may be cylindrical as shown.

Flange 27 has a downward facing transition shoulder 47 that joins the outer diameter of flange 27 with a lower cylindrical portion of lower tubular 17. Both transition shoulder 47 and abutment shoulder 25 are in planes generally perpendicular to axis 31. Flange 27 may include an undercut 45, which is an annular groove or recess extending around pin 17 at a junction of the lower cylindrical portion of pin 17 with transition shoulder 47. Undercut 45 extends upward within flange 27 generally concentric to axis 31. The generally cylindrical surface of lower tubular 17 directly below transition shoulder 47 is for engagement with an elevator (not shown) for lifting and further manipulation of lower tubular 17. When viewed in cross section as in FIG. 2, undercut 45 has a curved inner wall 45a, a curved outer wall 45b and a curved base 45c joining inner wall 45a to outer wall 45b. In cross section, undercut 45 has the appearance of a continuously curved U-shaped groove with a partially elliptical configuration. Inner wall 45a is flush with the cylindrical exterior of lower tubular 17. The radial width of undercut 45 is less than an axial depth of undercut 45. The radial width of undercut 45 is less than one-half the radial width of transition shoulder 47. The axial depth of undercut 45 is less than one-half the axial thickness of external flange 27 from abutment shoulder 25 to transition shoulder 47. The axial thickness of external flange 27 measured from undercut base 45c to abutment shoulder 25 is less than measured along outer diameter 27.

Elliptical undercut 45 provides a longer transition area between flange 27 and lower tubular 17, reducing stress at the transition between flange 27 and lower tubular 17. A person skilled in the art will recognize that the depth or radii of undercut 45 will vary depending on the particular connector type and connector size. A person skilled in the art will also recognize that undercut 45 may be made with any suitable manufacturing process such as by machining or forging.

Continuing to refer to FIG. 2, upper tubular 19 includes a box end 49 having an outer diameter substantially equivalent to the outer diameter of flange 27 of pin end 23. Box end 49 depends downwardly from upper tubular 19 and has a lower end or rim that defines a downward facing shoulder 51. A tubular wall at box end 49 has a thickness at rim 51 that is substantially equivalent to the width of abutment shoulder 25 of flange 27. Box end 49 has a length substantially equivalent to the length of pin 33 and includes a distal box end portion 53, a medial box end portion 55, and a proximal box end portion 57. Proximal box end portion 57 joins upper tubular 19. Proximal box end portion 57 optionally may have an inner diameter larger than the inner diameter of upper tubular 19 so that a downward facing internal shoulder 58 is formed where proximal box end portion 57 joins upper tubular 19. Distal box end portion 53 may be located at an end of box end portion 49 opposite proximate box end portion 57. Distal box end portion 53 may be substantially cylindrical and have an outer diameter equivalent to the outer diameter of flange 27 of lower tubular 17 and an inner diameter greater than the inner diameter of upper tubular 19. In the illustrated embodiment, the inner diameter of distal box end portion 53 is substantially equivalent to the outer diameter of proximal pin end portion 35 so that distal box end portion 53 may surround proximal pin end portion 35 of lower tubular 17. Medial box end portion 55 has a general conical inner diameter extending between distal box end portion 53 and proximal box end portion 57. Medial box end portion 55 may have threads 59 formed on an inner diameter surface that mate with threads 41 on the outer diameter surface of pin end medial portion 37. A person skilled in the art will recognize that the angle of the conical surfaces of pin end medial portion 37 and medial box end portion 55 may be substantially the same so that threads 41, 59 may thread together to join upper tubular 19 to lower tubular 17. A person skilled in the art will understand that upper tubular 19 and lower tubular 17 may be joined by any suitable means. For example, upper tubular 19 and lower tubular 17 may be secured by threaded couplers as shown herein, cammed couplers, collet couplers, or the like.

Proximal box end portion 57 may be generally cylindrical and extends from upper tubular 19 to medial box end portion 55. Proximal box end portion 57 may have an outer diameter greater than the outer diameter of upper tubular 19 so that proximal box end portion 57 defines an upward facing transition shoulder 61 on an outer diameter of upper tubular 19. Transition shoulder 61 may include an undercut 63 having the same configuration in cross section as undercut 45. Undercut 63 encircles upper tubular 19 and is formed in transition shoulder 61. Undercut 63 is an annular groove formed at the junction of proximal box end portion 57 with upper tubular 19. Undercut 63 may have the same diameter as undercut 45. Undercut 63 provides a longer transition area between proximal box end portion 57 and upper tubular 19, reducing stress at the transition between proximal box end portion 57 and upper tubular 19. A person skilled in the art will recognize that the depth or radii of undercut 63 will vary depending on the particular connector type and connector size. A person skilled in the art will also recognize that undercut 63 may be made with any suitable manufacturing process such as by machining or forging. In the illustrated embodiment, elliptical undercuts 45, 63 may have the same radii. In other exemplary embodiments, elliptical undercuts 45, 63 may have different radii.

Continuing to refer to FIG. 2, joint 21 may be assembled in the following manner. Box end 49 of upper tubular 19 may be brought proximate to pin end 23 of lower tubular 17. Upper tubular 19 may be manipulated to place box end 49 around pin end 23, bringing threads 41, 59 axially adjacent to each other. In an exemplary embodiment, box end 49 will be brought proximate to and may land on shoulder 25. Threads 41, 59 may be in contact, but not engaged, with one another. Upper tubular 19 may then be rotated relative to lower tubular 17, causing threads 41, 59 to engage and securing upper tubular 19 to lower tubular 17. A person skilled in the art will understand that the relative positions of upper tubular 19 and lower tubular 17 may be reversed so that lower tubular 17 and pin end 23 may be stabbed into upper tubular 19 and box end 49. A person skilled in the art will also understand that different methods to secure upper tubular 19 to lower tubular 17 may be used.

In an exemplary embodiment, when distal box end portion 49 lands on flange 27 and rim 51 may abut abutment shoulder 25. Stresses incurred in the tubulars 17, 19 that may pass through pin end 23 and box end 45 may be transferred over the longer transition paths of elliptical undercuts 45, 63. In addition, an elevator may engage transition shoulder 47 without interference from elliptical undercut 45. Any stress caused by the application of force needed to lift lower tubular 17 by flange 27 may be better distributed across the transition of elliptical undercut 45.

A person skilled in the art will understand that while the tubular members are referred to as a lower tubular member and an upper tubular member, it is not necessary that the members be assembled or positioned relative to one another as shown. For example, a first tubular member 17 having upwardly facing shoulder 43 may be axially above a second tubular member 19 having box end 49 and the components described above. Joint 21 may then operate generally as described above. A person skilled in the art will recognize that such positioning is contemplated and included in the disclosed embodiments. A person skilled in the art will recognize that in instances where upper tubular 19 and lower tubular 17 are reversed so that a tubing elevator may lift upper tubular 19 by shoulder 61, elliptical undercut 63 may provide the same stress reduction benefits as elliptical undercut 45 of lower tubular 17. Undercuts in both the pin end and the box end may not always be needed. The undercut for the box end may be eliminated in some applications. Also, in some embodiments, the box end may not have an upper transition shoulder that is in a plane perpendicular to the axis.

An advantage of a preferred embodiment is that it provides a tubular connector that transitions between the tubular and the tubular connector over a longer distance. This transition has a reduced stress across the transition between the tubular and the connector. In addition, the disclosed embodiments provide a tubular connector that may be used with conventional tubing elevators.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A tubular connector having an axis and comprising:
   a pin having a bore, an axially extending cylindrical portion, and external threads;
   a box having a bore with internal threads that engage the external threads of the pin, the box having a rim on an end of the box;
   the box having a cylindrical portion opposite the rim that is of smaller outer diameter than a portion of the box containing the internal threads;
   a transition shoulder on at least one of the box or pin, the transition shoulder being in a transition shoulder plane perpendicular to the axis and having an outer diameter that is larger than the cylindrical portion of said box or pin adjoining the transition shoulder; and
   an annular undercut recess located on the transition shoulder at a junction with the cylindrical portion joining the transition shoulders, wherein, when viewed in cross section, the undercut recess has an inner curved wall that is flush with and parallel to the outer diameter of the cylindrical portion adjoining the transition shoulder; and
   wherein an inner diameter of the bore of the at least one box or pin at the transition shoulder plane is in fluid communication with the cylindrical portion of the pin and the box.

2. The tubular connector of claim 1, wherein the undercut recess has a partially elliptical profile in cross section.

3. The tubular connector of claim 1, wherein the undercut recess when viewed in cross section is a continuous U-shaped curve with an axial depth greater than a radial width.

4. The tubular connector of claim 1, wherein the transition shoulder and the undercut recess are located on the box.

5. The tubular connector of claim 1, wherein:
   the transition shoulder and the undercut recess are located on an the external flange of the pin; and
   the undercut recess has an axial depth that is less than one-half an axial thickness of the external flange.

6. The tubular connector of claim 5, wherein the external flange has a lesser axial thickness measured between the undercut recess and the abutment shoulder than measured at the outer diameter of the external flange.

7. The tubular connector of claim 1, wherein:
   when viewed in cross section, the undercut recess further comprises an outer curved wall, and a curved base joining the inner curved wall with the outer curved wall.

8. A tubular connector of claim 1, wherein the undercut recess has a radial width that is less than one-half a radial width of the transition shoulder on which it is located.

9. A tubular connector, comprising:
   a box having a bore, an axis, and internal threads;
   a rim on an end of the box, the box having a cylindrical portion opposite the rim that is of smaller outer diameter than a portion of the box containing the internal threads, defining a box transition shoulder for engagement with a tubing elevator, the box transition shoulder being in a transition shoulder plane perpendicular to the axis; and an annular undercut recess formed in an inner diameter portion of the box transition shoulder, the undercut recess being continuously curved in cross-section and having an axial depth greater than a radial width, the undercut recess having an inner curved wall that is flush with and parallel to a cylindrical outer surface of the box at the plane of the box transition shoulder; and wherein an inner diameter of the bore of the box at the transition shoulder plane is in fluid communication with a pin with external threads that engage the internal threads of the box.

10. The tubular connector of claim 9, wherein the undercut recess has a partially elliptical profile in cross section.

11. The tubular connector of claim 9, wherein the undercut recess when viewed in cross section is a continuous U-shaped curve.

12. The tabular connector of claim 9, wherein wherein an inner diameter of the cylindrical portion of the box is smaller that an inner diameter of the portion of the box containing the internal threads, defining an internal shoulder, and wherein the undercut recess has an axial depth that is less than one-half an axial distance between the internal shoulder and the box transition shoulder.

13. The tubular connector of claim 9, wherein:

when viewed in cross section, the undercut recess further comprises, an outer curved wall, and a curved base joining the inner curved wall with the outer curved wall.

14. The tubular connector of claim 9, wherein the undercut recess has a radial width that is less than one-half a radial width of the box transition shoulder.

15. A tubular connector having an axis and comprising:

a pin having a bore, an axially extending cylindrical portion, and external threads;

a box having a bore with internal threads that engage the external threads, the box having a rim on an end;

the box having a cylindrical portion opposite the rim that is of smaller outer diameter than a portion of the box containing the internal threads, defining a box transition shoulder that is in a transition shoulder plane perpendicular to the axis; and an annular undercut recess located on an inner diameter portion of the box transition shoulder, wherein when viewed in cross section, the undercut recess has an inner curved wall with a tangent line that is parallel with the outer diameter of the cylindrical portion adjoining the transition shoulder; and wherein an inner diameter of the bore of the box or pin at the transition shoulder plane is in fluid communication with the cylindrical portion of the pin and the box.

16. The tubular connector of claim 15, wherein the undercut recess when viewed in cross section is a continuous U-shaped curve with an axial depth greater than a radial width.

17. The tubular connector of claim 15, wherein:

when viewed in cross section, the undercut recess further comprises an outer curved wall, and a curved base joining the inner curved wall with the outer curved wall; and wherein the inner curved wall is flush with the cylindrical portion adjoining the box transition shoulder.

18. The tubular connector of claim 15, wherein the undercut recess has a radial width that is less than one-half a radial width of the box transition shoulder.

19. The tubular connector of claim 15, further comprising;

an external flange on the pin having a pin transition shoulder, the pin transition shoulder being in a plane perpendicular to the axis and joining a cylindrical portion of the pin having a smaller outer diameter than an outer diameter of the external flange; and an annular undercut recess in the pin transition shoulder, wherein when viewed in cross section, the undercut recesses has an inner curved wall with a tangent line that is parallel with the outer diameter of the cylindrical portion adjoining the pin transition shoulder.

* * * * *